US012074389B2

(12) United States Patent
Yamaguchi et al.

(10) Patent No.: US 12,074,389 B2
(45) Date of Patent: Aug. 27, 2024

(54) RADIO COMMUNICATION MODULE

(71) Applicant: Murata Manufacturing Co., Ltd., Nagaokakyo (JP)

(72) Inventors: Osamu Yamaguchi, Nagaokakyo (JP); Noriyuki Ueki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 295 days.

(21) Appl. No.: 17/836,190

(22) Filed: Jun. 9, 2022

(65) Prior Publication Data

US 2022/0302594 A1 Sep. 22, 2022

Related U.S. Application Data

(63) Continuation of application No. PCT/JP2021/000677, filed on Jan. 12, 2021.

(30) Foreign Application Priority Data

Feb. 17, 2020 (JP) .................................. 2020-23924

(51) Int. Cl.
*H01Q 9/04* (2006.01)
*H01Q 5/10* (2015.01)

(52) U.S. Cl.
CPC ............ *H01Q 9/0421* (2013.01); *H01Q 5/10* (2015.01); *H01Q 9/0435* (2013.01)

(58) Field of Classification Search
CPC ....... H01Q 9/0421; H01Q 9/0435; H01Q 5/10
USPC ........................................................ 361/750
See application file for complete search history.

(56) References Cited

U.S. PATENT DOCUMENTS

| | | | | |
|---|---|---|---|---|
| 2008/0259585 | A1 | 10/2008 | Fujii | |
| 2012/0280890 | A1 | 11/2012 | Kusumoto | |
| 2015/0145747 | A1 | 5/2015 | Chung et al. | |
| 2015/0188230 | A1* | 7/2015 | Kim | H01Q 5/364 343/700 MS |
| 2019/0229421 | A1* | 7/2019 | Onaka | H01Q 9/06 |

FOREIGN PATENT DOCUMENTS

| | | | |
|---|---|---|---|
| JP | 2008085639 | A | 4/2008 |
| JP | 2010245931 | A | 10/2010 |
| WO | 2007083574 | A1 | 7/2007 |
| WO | 2011086723 | A1 | 7/2011 |

OTHER PUBLICATIONS

International Search Report in PCT/JP2021/000677, mailed Apr. 20, 2021, 3 pages.

* cited by examiner

*Primary Examiner* — Andargie M Aychillhum
(74) *Attorney, Agent, or Firm* — ArentFox Schiff LLP

(57) ABSTRACT

A radio communication module is provided that includes a circuit board, a first radiation conductor, and an insulating resin. In the circuit board, a first main surface and a second main surface are included, and a second radiation conductor is provided on the second main surface of the circuit board. The first radiation conductor is flat and is provided near the first main surface. The insulating resin is provided near the first main surface side. The thickness of the first radiation conductor is larger than the thickness of the second radiation conductor.

20 Claims, 7 Drawing Sheets

RADIO COMMUNICATION MODULE

CROSS REFERENCE TO RELATED APPLICATIONS

This application is a continuation of PCT Application No. PCT/JP2021/000677, filed Jan. 12, 2021, which claims priority to Japanese Patent Application No. 2020-023924, filed Feb. 17, 2020, the entire contents of each of which are hereby incorporated in their entirety.

TECHNICAL FIELD

The present invention relates to a radio communication module including an antenna for radio frequency (RF) wireless communication.

BACKGROUND

WO 2007/083574 A (hereinafter "Patent Literature 1") describes a radio integrated circuit (IC) device for radio communication with RF signals (e.g., high frequency signals). The radio IC device includes an antenna for radio communication. In Patent Literature 1, the antenna, which can be a monopole or dipole antenna, is attached to a circuit board.

The radio communication module, such as the radio IC device, includes not only an antenna having a shape as shown in Patent Literature 1. Examples of radio communication modules include a radiation plate made of a flat conductor.

Such a flat radiation plate may be disposed apart from the main surface, and may be disposed in parallel to the main surface of the circuit board on which other circuit elements of the radio communication module are mounted. In this case, the radiation plate and the circuit board are connected by a connection conductor, which extends in a direction substantially orthogonal to the radiation plate and the main surface of the circuit board.

However, as described above, in a mode where the radiation plate and the circuit board are disposed apart from each other, defects including deformation of the radiation plate can occur when the surface on the side where the radiation plate is disposed is sealed with an insulating resin.

SUMMARY OF THE INVENTION

Accordingly, it is an object of the present invention to prevent the defects related to the radiation plate when the radiation plate and the circuit board are disposed apart from each other and sealed with the insulating resin.

Thus, in an exemplary aspect, a radio communication module is provided that includes a circuit board, a first radiation conductor, and an insulating resin. In the circuit board, an insulating main body having a first main surface and a second main surface is included, and a conductor pattern is formed on the second main surface side. The first radiation conductor is flat and is provided on the first main surface side away from the first main surface. The insulating resin is formed on the first main surface side at a height that at least covers the surface of the first radiation conductor on the circuit board side. The thickness of the first radiation conductor is larger than the thickness of the conductor pattern of the circuit board.

In this configuration, the first radiation conductor having a larger thickness is not easily deformed even with stress applied when sealed with the insulating resin.

According to the exemplary embodiment of the present invention, the defects related to the radiation plate are prevented when the radiation plate and the circuit board are disposed apart from each other and sealed with the insulating resin.

DETAILED DESCRIPTION OF EMBODIMENTS

First Exemplary Embodiment

Figure 1A:
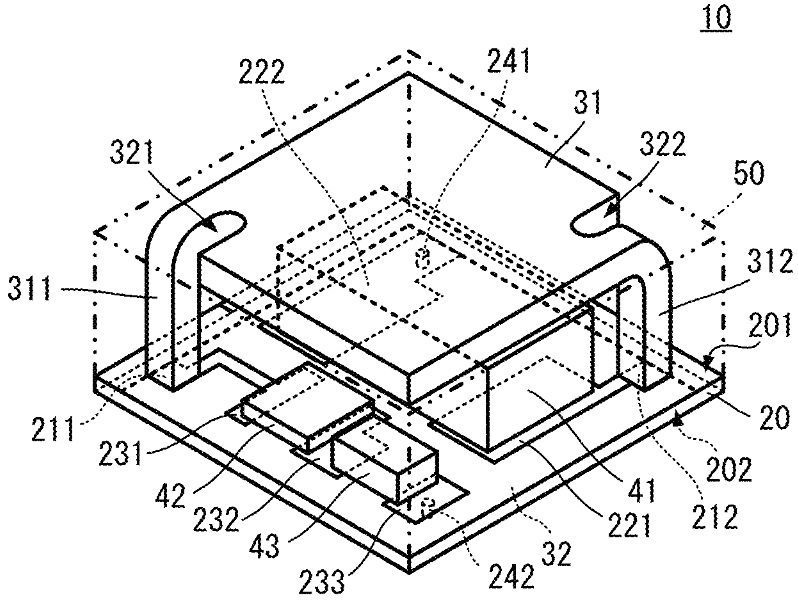
FIG. 1A is an external perspective view of a radio communication module 10 according to a first exemplary embodiment.
Figure 1B:
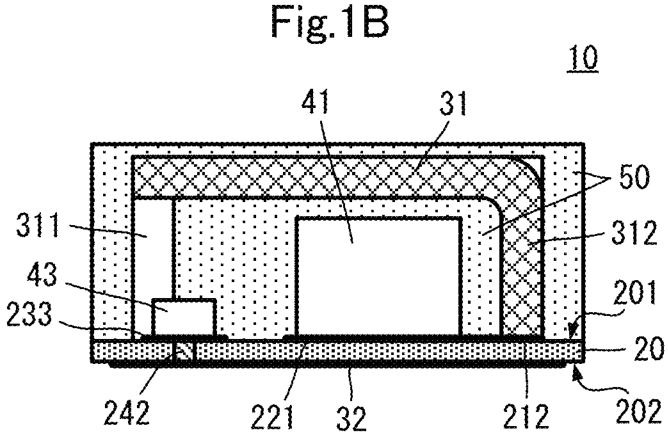
FIG. 1B is a schematic side sectional view illustrating a configuration of the radio communication module 10 according to the first exemplary embodiment.
Figure 2:
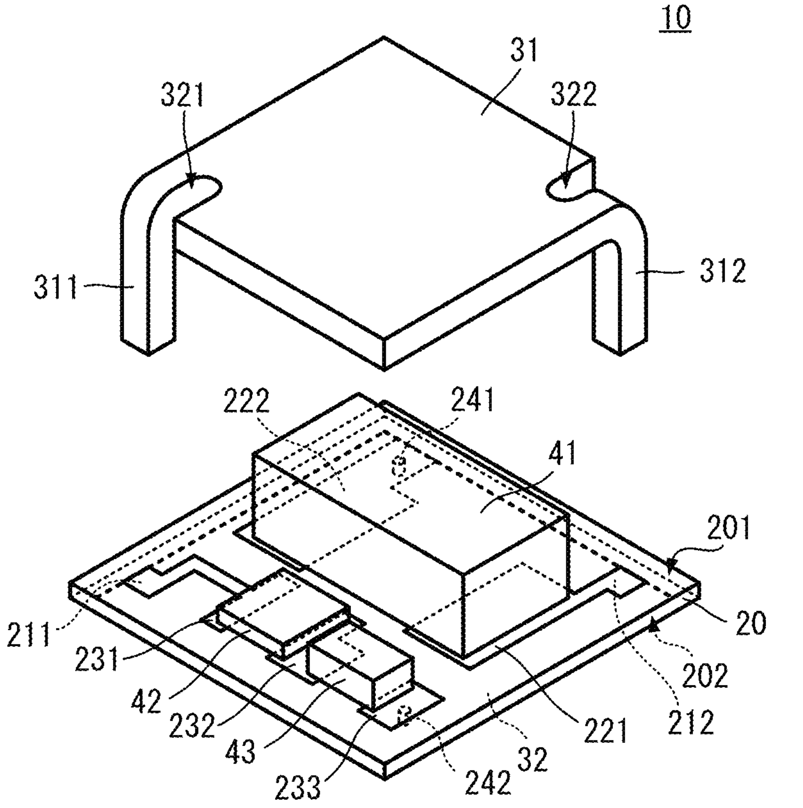
FIG. 2 is an exploded perspective view of the radio communication module 10 according to the first exemplary embodiment.
Figure 3A:
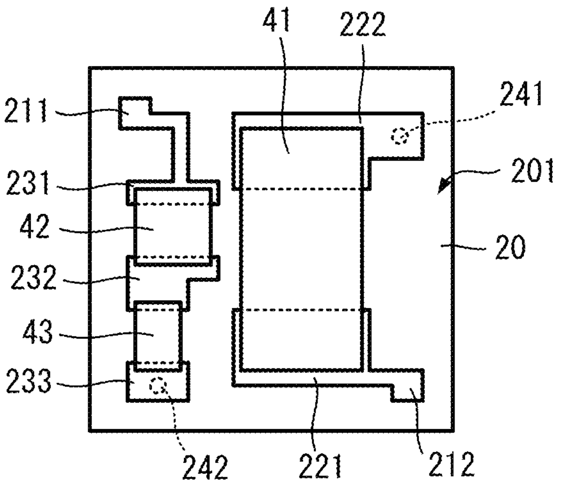
FIG. 3A is a plan view of a circuit board 20 on a first main surface 201 side.
Figure 3B:
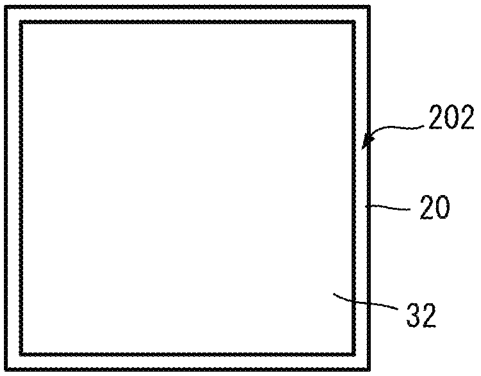
FIG. 3B is a plan view of the circuit board 20 on a second main surface 202 side.
Figure 4D:
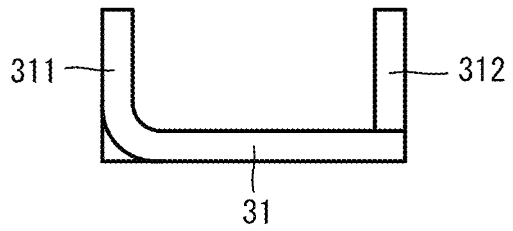
FIGS. 4B, 4C, 4D, and 4E are all side views of the first radiation conductor 31.
Figure 4B:
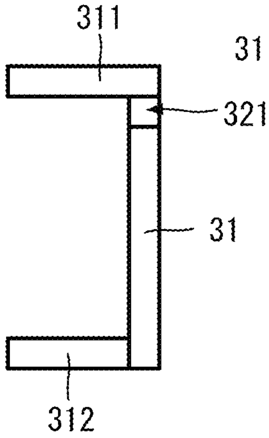
Figure 4A:
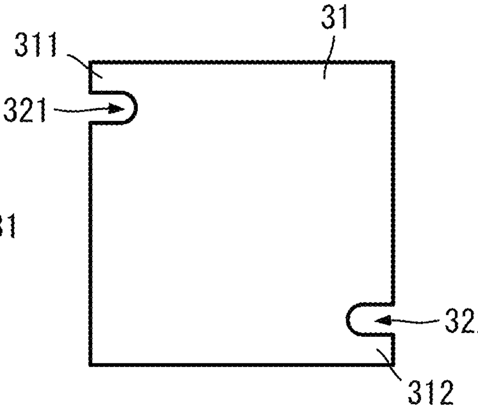
FIG. 4A is a plan view of a first radiation conductor 31.
Figure 4C:
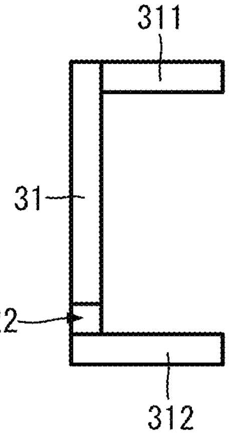
Figure 4E:
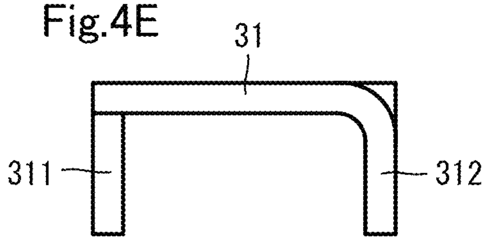
Figure 5:
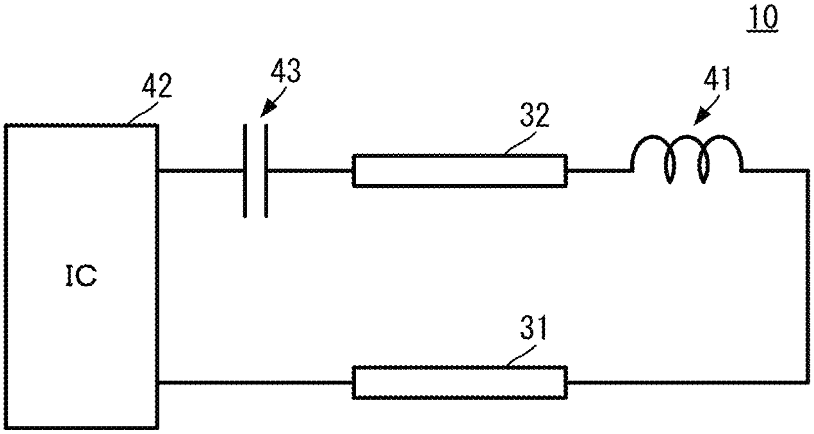
FIG. 5 is an equivalent circuit schematic of the radio communication module 10 according to the first exemplary embodiment.

A radio communication module according to a first exemplary embodiment will be described with reference to the drawings. FIG. 1A is an external perspective view of a radio communication module 10 according to the first embodiment, and FIG. 1B is a schematic side sectional view illustrating a configuration of the radio communication module 10 according to the first embodiment. In FIG. 1A, the outer shape of an insulating resin (sealing resin) is indicated by a two-dot chain line. FIG. 2 is an exploded perspective view of the radio communication module 10 according to the first embodiment in which the insulating resin (sealing resin) is omitted. FIG. 3A is a plan view of a circuit board 20 on a first main surface 201 side, and FIG. 3B is a plan view of the circuit board 20 on a second main surface 202 side. FIG. 3A illustrates a state in which components excluding a first radiation conductor 31 are mounted. FIG. 4A is a plan view of the first radiation conductor 31, and FIGS. 4B, 4C, 4D, and 4E are all side views of the first radiation conductor 31. FIG. 5 is an equivalent circuit schematic of the radio communication module 10 according to the first exemplary embodiment.

As illustrated in FIGS. 1A, 1B, and 2, the radio communication module 10 includes the circuit board 20, the first radiation conductor 31, a second radiation conductor 32, an inductor component 41, an IC 42, a capacitor component 43, and an insulating resin 50.

(Mounting Structure of the Circuit Board 20 and Components Excluding the First Radiation Conductor 31)

As illustrated in FIGS. 1A, 1B, 2, 3A, and 3B, the circuit board 20 is a flat plate having the first main surface 201 and the second main surface 202 that oppose each other. In an exemplary aspect, the circuit board 20 can be mainly formed of insulating materials (for example, glass epoxy resin, Bismaleimide Triazine (BT) resin, and low-temperature fired ceramic).

A land conductor 211, a land conductor 212, a land conductor 221, a land conductor 222, a land conductor 231, a land conductor 232, and a land conductor 233 are formed on the first main surface 201 of the circuit board 20. The second radiation conductor 32 is formed on the second main surface 202 of the circuit board 20. In an exemplary aspect, the second radiation conductor 32 has a rectangular shape extending over substantially the entire surface of the second main surface 202. A plurality of land conductors on the first main surface 201 and the second radiation conductor 32 on the second main surface 202 have a thickness of, for example, about tens of μm.

The inductor component 41 includes a spiral conductor pattern formed inside. As an example, the inductor component 41 has external connection terminals at both ends of a housing. The axial direction of the spiral conductor pattern is substantially parallel to the direction in which these external connection terminals are connected. It is noted that the inductor component is not limited to this structure. However, with this configuration provided in the inductor component 41, the axial direction of the spiral (which is the axial direction of the magnetic field generated by the inductor component 41) is not orthogonal to a flat surface of the first radiation conductor 31. Consequently, the magnetic field of the inductor component 41 is not easily blocked by the first radiation conductor 31, preventing degraded characteristics of the inductor component 41. The inductor component 41 is mounted on the land conductor 221 and the land conductor 222.

In an exemplary aspect, the IC 42 includes a circuit configured for transmission processing, reception processing, and the like, in the radio communication module 10. The IC 42 is mounted on the land conductor 231 and the land conductor 232.

The capacitor component 43 is mounted on the land conductor 232 and the land conductor 233.

In this configuration, the inductor component 41, the IC 42, and the capacitor component 43 are mounted on the first main surface 201 side of the circuit board 20. Further, the circuit board 20 enables a circuit as illustrated in FIG. 5 in the radio communication module 10.

In the radio communication module 10, a current path is formed by connecting the capacitor component 43 (i.e., a capacitor), the second radiation conductor 32, the inductor component 41 (i.e., an inductor), and the first radiation conductor 31 with the IC 42. The inductor component 41 and the capacitor component 43 are connected in a closed loop via the IC 42, and form an LC series resonance circuit.

A resonance frequency of the resonance circuit matches or approaches a frequency of the communication frequency band. In other words, the inductance of the inductor component 41 and the capacitance of the capacitor component 43 are set such that the resonance frequency of the resonance circuit, which is configured with the first radiation conductor 31 and the second radiation conductor 32, matches or approaches the frequency of the radio-frequency signals which the radio communication module 10 uses for radio communication. Additionally, although a stray capacitance is formed between the first radiation conductor 31 and the second radiation conductor 32, it hardly affects the resonance frequency.

Further, the land conductor 222, where the inductor component 41 is mounted, is connected to the second radiation conductor 32 by a via conductor 241 that extends through (i.e., penetrates) the circuit board 20 in the thickness direction. The land conductor 233, where the capacitor component 43 is mounted, is connected to the second radiation conductor 32 by a via conductor 242 penetrating the circuit board 20 in the thickness direction. The position at which the via conductor 241 is connected to the second radiation conductor 32 and the position at which the via conductor 242 is connected to the second radiation conductor 32 correspond to diagonal positions of the second radiation conductor 32 on the second main surface 202.

The land conductor 211 and the land conductor 212 are respectively disposed at diagonal positions on the first main surface 201. These diagonal positions are different from those formed by the position at which the via conductor 241 is connected to the second radiation conductor 32 and the position at which the via conductor 242 is connected to the second radiation conductor 32.

The land conductor 211 is connected to the land conductor 231. The land conductor 212 is connected to the land conductor 221.

(Structure of the First Radiation Conductor 31 and Mounting Mode of the First Radiation Conductor 31 on the Circuit Board 20)

As illustrated in FIGS. 1A, 1B, 2, and 4A, the first radiation conductor 31 is a flat plate having a substantially rectangular shape as can be seen from the plan view. The thickness of the first radiation conductor 31 is, for example, hundreds of μm. In the exemplary aspect, the thickness of the first radiation conductor 31 is larger, preferably twice and more than that of the second radiation conductor 32. In most cases where the dielectric loss of the insulating resin 50 is larger than that of the circuit board 20, an effect of reducing the current density on the first radiation conductor 31 can be achieved, leading to a reduction in the high-frequency loss.

A connection conductor 311 and a connection conductor 312 are connected to the first radiation conductor 31. More specifically, the connection conductor 311 and the connection conductor 312 are respectively connected at two diagonal positions of the first radiation conductor 31.

The connection conductor 311 and the connection conductor 312 are columnar in the exemplary aspect. The connection conductor 311 and the connection conductor 312 are shaped as extending in directions orthogonal to the main surface (flat plate surface) of the first radiation conductor 31.

Further, in the present embodiment, the connection conductor 311 and the connection conductor 312 are formed integrally with the first radiation conductor 31. More specifically, the connection conductor 311 and the connection conductor 312 are formed by bending columnar portions protruding from diagonal positions of the first radiation conductor 31 to be substantially right.

The first radiation conductor 31 is disposed on the first main surface 201 side of the circuit board 20. The first radiation conductor 31 is disposed such that the flat surface which is its main surface is parallel to the first main surface 201. Further, the first radiation conductor 31 is disposed to overlap with the inductor component 41, the IC 42, and the capacitor component 43 in the plan view. Additionally, it is preferable that the first radiation conductor 31 completely overlaps with all the inductor component 41, the IC 42, and the capacitor component 43 in the plan view, but the first radiation conductor 31 can only partially overlap with them in an alternative aspect. Such configuration of complete overlap allows smaller planar shape of the radio communication module 10, can prevent the inductor component 41, the IC 42, and the capacitor component 43 from an influence from the electromagnetic wave radiated from the first radiation conductor 31 into the space, and can reduce deterioration of the radiation characteristics.

As further shown in FIG. 1A, the leading end portion of the connection conductor 311 (which is the end portion opposite to the end portion connected to the first radiation conductor 31) is mounted on the land conductor 211. The leading end portion of the connection conductor 312 (which is the end portion opposite to the end portion connected to the first radiation conductor 31) is mounted on the land conductor 212. Accordingly, the first radiation conductor 31 is physically fixed and electrically connected via the connection conductor 311 and the connection conductor 312. In other words, the first radiation conductor 31 is provided away from the first main surface 201 of the circuit board 20.

As illustrated in FIG. 1B, appropriate lengths of the connection conductor 311 and the connection conductor 312 eliminate the contact of the inductor component 41 with the surface of the first radiation conductor 31 facing the first main surface 201 of the circuit board 20.

(Configuration of the Insulating Resin 50)

As illustrated in FIGS. 1A and 1B, the insulating resin 50 covers the first main surface 201 side of the circuit board 20. In particular, the insulating resin 50 completely covers the inductor component 41, the IC 42, the capacitor component 43, and the first radiation conductor 31. The insulating resin 50 is also filled in the space of the first radiation conductor 31 on the first main surface 201 side.

This configuration protects the first main surface 201 side of the circuit board 20 from the external environment. Consequently, for example, this configuration improves the reliability of the radio communication module 10.

The insulating resin 50 is made of, for example, an epoxy resin. An example of the insulating resin 50 is formed as follows. The epoxy resin with high fluidity is poured into a frame in a state of surrounding the first main surface 201 side of the circuit board 20 on which a plurality of components are mounted (which may be a multi-board state in which a plurality of circuit boards 20 are integrated). In this state, pressure or the like applied to the epoxy resin solidifies it. Consequently, the insulating resin 50 forms a structure in a dense state which eliminates voids and the like.

Then, the pressure is applied from a side of the first radiation conductor 31 opposite to the side of the circuit board 20. Accordingly, a stress caused by pressure is applied to the first radiation conductor 31. However, the large thickness of the first radiation conductor 31 prevents a deformation caused by the stress. Consequently, the first radiation conductor 31 can maintain a desired shape as the radio communication module 10, and the radio communication module 10 can realize its desired communication characteristics. In other words, the radio communication module 10 can prevent the occurrence of defects in the first radiation conductor 31 due to the use of the insulating resin 50, and can achieve its desired communication characteristics.

Further, in the above configuration, the connection conductor 311 and the connection conductor 312 may also be thicker. This configuration allows the first radiation conductor 31 to be firmly supported, and the positional relationship between the first radiation conductor 31 and the circuit board 20 to be maintained even under the pressure and stress applied thereto. In addition, it is possible to maintain a connection state between the connection conductor 311 and the circuit board 20 and between the connection conductor 312 and the circuit board 20, that is, a connection state between the first radiation conductor 31 and the circuit board 20. As a result, the radio communication module 10 reliably prevents the occurrence of defects in the first radiation conductor 31 due to the use of the insulating resin 50, and achieves its desired communication characteristics.

Further, in the above configuration, the connection conductor 311 and the connection conductor 312 are integrally formed with the first radiation conductor 31. This configuration allows the connection state between the connection conductor 311 and the first radiation conductor 31 and between the connection conductor 312 and the first radiation conductor 31 to be more reliably maintained even under the above pressure and stress applied. As a result, the radio communication module 10 can more reliably prevent the occurrence of defects in the first radiation conductor 31 due to the use of the insulating resin 50, and can achieve its desired communication characteristics.

As illustrated in FIGS. 1A, 2, and 4A, the radio communication module 10 includes a recess 321 at a connection portion between the first radiation conductor 31 and the connection conductor 311. The recess 321 is recessed from the side surface where the first radiation conductor 31 is connected to the connection conductor 311. Also, the radio communication module 10 includes a recess 322 at a connection portion between the first radiation conductor 31 and the connection conductor 312. The recess 322 is recessed from the side surface where the first radiation conductor 31 is connected to the connection conductor 312. Based on this configuration, the insulating resin 50 easily flows into the circuit board 20 side of the first radiation conductor 31 through the recess 321 and the recess 322. Accordingly, this more reliably enables a structure in which the insulating resin 50 is filled between the first radiation conductor 31 and the circuit board 20. Further, the recess 321 facilitates the bending of the connection conductor 311. Similarly, the recess 322 facilitates the bending of the connection conductor 312.

Further, the thickness of the first radiation conductor 31 is preferably as large as possible in order to improve the radiation characteristics of the first radiation conductor 31. However, a suitable thickness of the first radiation conductor 31 based on the height of the radio communication module 10 or the like can help achieve a balance between the radiation characteristics and miniaturization (to be thinner).

Second Exemplary Embodiment

Figure 6A:
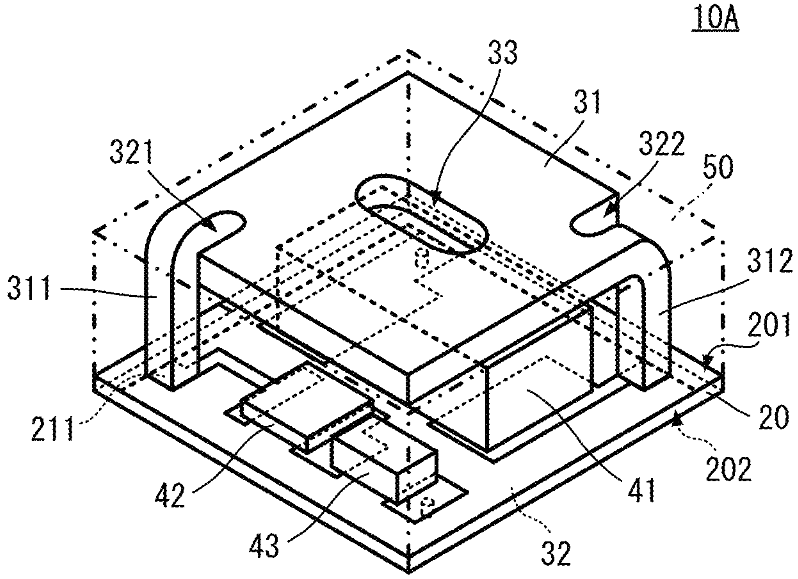
FIG. 6A is a perspective view illustrating a configuration of a radio communication module 10A according to a second embodiment.

A radio communication module according to a second exemplary embodiment will be described with reference to the drawings. FIG. 6A is a perspective view illustrating a configuration of a radio communication module 10A according to the second embodiment, and FIG. 6B is a plan view of the radio communication module 10A according to the second embodiment in which the insulating resin 50 is omitted.

Figure 6B:
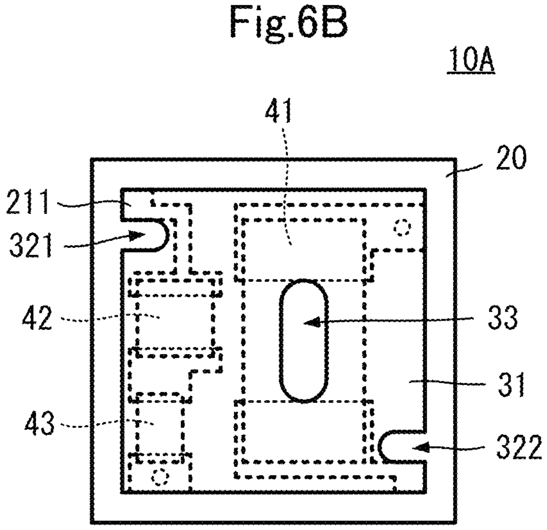
FIG. 6B is a plan view of the radio communication module 10A according to the second exemplary embodiment.

As illustrated in FIGS. 6A and 6B, the radio communication module 10A according to the second embodiment differs from the radio communication module 10 according to the first embodiment in that, an opening 33 is provided in a first radiation conductor 31. The other configurations of the radio communication module 10A are similar to those of the radio communication module 10, and thus the descriptions of the similar configurations will be omitted.

The first radiation conductor 31 includes the opening 33. The opening 33 has a shape penetrating the first radiation conductor 31 in the thickness direction. The opening 33 overlaps with the inductor component 41 in the plan view of the radio communication module 10A.

The opening 33 further prevents the magnetic field generated by the inductor component 41 to be blocked by the first radiation conductor 31. This configuration improves the characteristics of the inductor component 41 and the characteristics of the radio communication module 10A. Further, the distance between the inductor component 41 and the first radiation conductor 31 may be even shortened in this configuration. This enables miniaturization (e.g., to be thinner) of radio communication module 10A.

In addition to eliminating the influence on the inductor component 41, the opening 33 reduces the electric field generated between the first radiation conductor 31 and the second radiation conductor 32. Accordingly, the insulating resin 50 and the circuit board 20 reduces the dielectric loss, and prevents the confinement of the electric field in the insulating resin 50 and the circuit board 20. Consequently, radiation capabilities of the electromagnetic field can be improved.

Third Exemplary Embodiment

Figure 7:
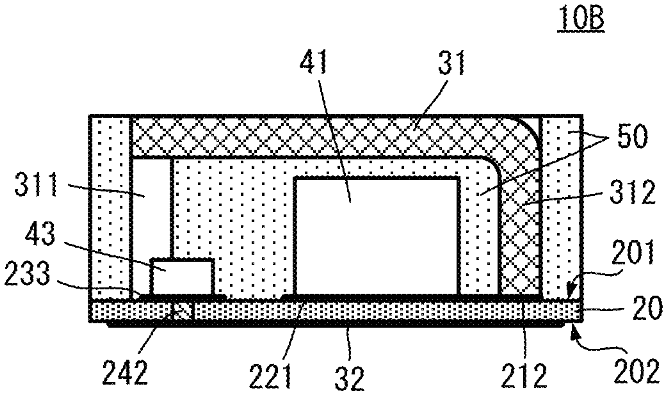
FIG. 7 is a schematic side sectional view illustrating a configuration of a radio communication module 10B according to a third exemplary embodiment.

A radio communication module according to a third exemplary embodiment will be described with reference to the drawings. FIG. 7 is a schematic side sectional view illustrating a configuration of a radio communication module 10B according to the third embodiment.

As illustrated in FIG. 7, the radio communication module 10B according to the third embodiment is different from the radio communication module 10 according to the first embodiment in the shape of an insulating resin 50. The other configurations of the radio communication module 10B are similar to those of the radio communication module 10, and the descriptions of thereof will be omitted.

As illustrated in FIG. 7, the insulating resin 50 of the radio communication module 10B is disposed to expose the surface of the first radiation conductor 31 (the surface opposite to the surface facing the circuit board 20) to the outside. Such configuration can also achieve effects similar to those of the above embodiments.

Further, in each of the above embodiments, the connection conductor 311 and the connection conductor 312 are connected at the diagonal positions of the first radiation conductor 31. However, the positions where the connection conductor 311 and the connection conductor 312 are connected to the first radiation conductor 31 are not limited thereto, and other positions may be set appropriately according to the directivity of the electromagnetic field radiated by the first radiation conductor 31 and the like.

In addition, the configurations of the above embodiments can achieve the effects according to the combination when appropriately combined.

REFERENCE SIGNS LIST

10, 10A, 10B radio communication module
20 circuit board
31 first radiation conductor
32 second radiation conductor
33 opening
41 inductor component
42 IC
43 capacitor component
50 insulating resin
201 first main surface
202 second main surface
211, 212, 221, 222, 231, 232, 233 land conductor
241, 242 via conductor
311, 312 connection conductor
321, 322 recess

The invention claimed is:

1. A radio communication module comprising:
a circuit board having an insulating main body with first and second main surfaces that oppose each other and a conductor pattern disposed on the second main surface;
a first radiation conductor having a flat shape that extends from the first main surface of the circuit board and is disposed away from the first main surface;
an insulating resin disposed at a height that at least covers a surface of the first radiation conductor; and
a plurality of connection conductors extending from the surface of the first radiation conductor towards the circuit board, such that the plurality of connection conductors mount the first radiation conductor on the circuit board,
wherein the first radiation conductor has a thickness that is larger than a thickness of the conductor pattern of the circuit board, and
wherein the plurality of connection conductors are disposed at positions diagonally to the first radiation conductor.

2. The radio communication module according to claim 1, wherein the plurality of connection conductors have a columnar shape.

3. The radio communication module according to claim 1, further comprising a plurality of land conductors disposed on the first main surface of the circuit board.

4. The radio communication module according to claim 3, wherein the plurality of connection conductors are connected directly to the plurality of land conductors, respectively, to mount the first radiation conductor on the circuit board.

5. The radio communication module according to claim 1, wherein the flat shape of the first radiation conductor extends in a direction parallel to the first main surface of the circuit board.

6. The radio communication module according to claim 1, wherein the first radiation conductor comprises a rectangular planar shape and the plurality of connection conductors extend in an orthogonal direction of the flat shape from opposing corners of the rectangular planar shape and towards the first main surface of the circuit board.

7. The radio communication module according to claim 1, wherein the conductor pattern of the circuit board is a second radiation conductor.

8. The radio communication module according to claim 1, wherein an entire surface of the first radiation conductor is buried in the insulating resin.

9. The radio communication module according to claim 1, wherein the surface of the first radiation conductor on a side opposite to a side facing the circuit board is exposed from the insulating resin.

10. The radio communication module according to claim 1, wherein the thickness of the first radiation conductor is at least twice the thickness of the conductor pattern.

11. The radio communication module according to claim 1, wherein the respective thicknesses of the first radiation conductor and the conductor pattern are relative to a direction orthogonal to the first main surface of the circuit board.

12. The radio communication module according to claim 1, wherein the plurality of connection conductors and the first radiation conductor are integrated by a plate member.

13. The radio communication module according to claim 12, wherein the plurality of connection conductors is formed by bending the plate member.

14. The radio communication module according to claim 12, further comprising at least one recess adjacent to a portion connecting between the first radiation conductor and the plurality of connection conductors and recessed from a side surface of the plate member.

15. The radio communication module according to claim 1, further comprising an inductor component mounted on the first main surface of the circuit board, wherein the first radiation conductor has an opening at a position that overlaps the inductor component as viewed in a direction orthogonal to the first main surface of the circuit board.

16. A radio communication module comprising:

a circuit board with opposing first and second main surfaces;

a conductor pattern disposed on the second main surface of the circuit board;

a first radiation conductor having a flat shape disposed above the first main surface of the circuit board and extending in a direction parallel thereto;

an insulating resin that covers a surface of the first radiation conductor; and a plurality of connection conductors extending from the first radiation conductor towards the circuit board, such that the plurality of connection conductors mount the first radiation conductor on the circuit board, wherein the first radiation conductor has a thickness that is larger than a thickness of the conductor pattern, with the respective thicknesses extending in a direction orthogonal to the first main surface of the circuit board, and wherein the first radiation conductor comprises a rectangular shape and the plurality of connection conductors extend from opposing corners of the rectangular shape of the first radiation conductor and towards the first main surface of the circuit board.

17. The radio communication module according to claim 16, wherein the plurality of connection conductors have a columnar shape.

18. The radio communication module according to claim 16, further comprising a plurality of land conductors disposed on the first main surface of the circuit board, with the plurality of connection conductors being connected directly to the plurality of land conductors, respectively.

19. The radio communication module according to claim 16, wherein the conductor pattern of the circuit board is a second radiation conductor.

20. The radio communication module according to claim 16, wherein the thickness of the first radiation conductor is at least twice the thickness of the conductor pattern.

* * * * *